United States Patent Office 2,936,245
Patented May 10, 1960

2,936,245

COATING COMPOSITION ADAPTED FOR OVER-COATING A WAX SURFACE

Lloyd I. Osipow, Munsey, N.Y., and Dorothea C. Marra, Summit, N.J., assignors to Fannie Roberts Heyman No Drawing. Application January 10, 1958
Serial No. 708,071

9 Claims. (Cl. 106—189)

This invention relates to a coating composition adapted for coating a wax surface. More particularly, it relates to a non-toxic, coating composition and to a non-toxic coating on a pigment-wax surface, such as, for example, a film of cosmetic lipstick on the human lips, a drawing made with a child's wax crayons, the child's wax crayon itself, or a film of a wax shoe polish.

Cosmetic lipstick has come into almost universal use by women. Lipstick comprises essentially a plasticized, wax composition carrying a pigment, a dye, or both. Both users and manufacturers of lipsticks have been aware for many years of the limitations of lipsticks. The principal objectionable feature of lipstick is that it is readily transferred from the lips of the wearer to all objects that come in contact with the lips. The so-called "idelible" lipsticks are less readily transferred to contacting objects. However, they do transfer excessively and they have the further disadvantages of causing the lips to become dry and to tend to cause sensitization and allergic reactions.

Attempts have heretofore been made to over-come the objectionable smearing and transfer of lipstick films to other objects, by the provision of coating compositions which can be applied over the lipstick film to deposit a second, over-coating film, which retains the film of lipstick on the lips. Such coating compositions have been on the market for a number of years, but have had little commercial success. This has arisen from the fact that these compositions have had a variety of defects and objectionable features.

The formulation of a coating film which is suitable for preventing the transfer of lipstick to objects coming into contact with the lips is a difficult problem. The human lips provide a flexible and elastic base surface, which require a highly flexible and elastic coating. In addition, the coating requires the use of non-toxic materials which, upon application to the lips, do not give unpleasant sensations to the user, such as smarting or stinging.

The coating compositions for the over-coating of lipstick heretofore developed, which are aqueous solutions, dry slowly and produce water-sensitive films. Such water-sensitive films are softened or completely removed by the saliva of the mouth and by aqueous beverages, with unpleasant effects. Consequently, such coating compositions have ordinarily been solutions of plastics or resins, or combinations thereof, together with the plasticizers dissolved in volatile, organic solvents. Only minor amounts of waxes can be used in such compositions, since the waxes are leached out of the coating by the lipstick film and the continuity of the over-coating film is destroyed. The organic solvent or solvent mixture used in these compositions has depended upon the particular film-forming material which is used, but in any case, the film-forming material will not tolerate the presence of any significant quantity of water. Consequently, these solutions sting and smart the lips during the evaporation of the volatile solvent. Further, they become tacky upon drying, and if the lips are inadvertently closed and then opened during this tacky stage of drying, the film strings and separates from the lipstick. Again, the dried films have lacked the flexibility and elasticity required to conform to the changing shapes of the human lips. The entire effect has been most unpleasant.

It is an object of this invention to provide a coating composition for use over cosmetic lipstick which will virtually eliminate the transfer of the lipstick to objects coming into contact with the lips, while avoiding the foregoing disadvantages. This coating composition can be used on films of both the regular and the "indelible" types of lipstick. Since the coating composition prevents the removal of the lipstick from the lips, the lipstick stays on all day, and it is not necessary to re-apply fresh lipstick throughout the day. This coating composition covers aging lines around the lips, and consequently, gives the lips a more youthful appearance. Further, this coating composition produces a film which gives the lips an attractive, glossy and a moist appearance, which is quite effective from an esthetic standpoint.

The coating composition in accordance with this invention exhibits little, if any, tackiness during drying, and it has little tendency to give the user a stinging or smarting sensation during its application. Further, the film which it deposits is completely waterproof. Thus, the coating composition of this invention provides the advantages of being convenient and pleasant to apply to the lips, of depositing a film which makes the lips attractive in appearance, and retains the lipstick film on the lips by preventing its transfer to contacting objects.

In the foregoing, the advantages of the coating composition of this invention have been emphasized in connection with its use in combination with lipstick films, because of the unusually difficult problems involved. However, it will be recognized that the utility of this composition is not limited to its use as an over-coating for lipstick on the human lips. It is equally useful as an over-coating for any soft wax film on a flexible base material such as paper or leather, or on a base material which is both flexible and elastic, such as rubber.

This coating composition may be used to coat a child's crayon and has definite advantages over the paper cylinder which is conventionally used for this purpose, in that it can be used to coat the entire surface of the crayon. The film on the writing surface of the coated crayon can be readily removed by rubbing the surface against a sheet of paper. All other surfaces of the crayon remain completely coated and cannot discolor the hands. Further, the coating on the crayon is relatively impervious to water, as well as non-toxic. If a child places the coated crayon in his mouth, the coating protects him from contact with the pigmented wax.

Drawings made with wax crayons are subject to smearing upon contact with other objects. This coating composition may be applied over a crayon drawing to protect it from smearing and to give it a glossy finish. Since the composition is non-toxic, a child can spread the coating over a crayon drawing with his fingers, and subsequently place his fingers in his mouth without injury.

Wax compositions containing dyes or pigments or both are frequently applied to leather goods, such as shoes, handbags, and luggage to impart gloss and to cover scuff marks. It is not uncommon for the waxed objects to rub against other objects and discolor them. Thus, the transfer of shoe polish to the bottom of cuffs is a frequent nuisance. A coating of the composition of this invention on the waxed surface of leather goods, enhances the glossiness of the wax finish, increases its resistance to scuffing, increases its durability, retards the transfer of stain to other surfaces, reduces the adhesion of soil to the surfaces, and permits the soiled surfaces to be readily cleaned with a damp cloth.

In addition to the various advantageous features mentioned in the foregoing, other advantages will become apparent from the detailed description of the invention which follows.

The coating composition in accordance with this invention comprises essentially a solution of ethyl hydroxyethyl cellulose in a solvent composed of a mixture of ethanol, and a volatile, completely halogenated fluorine-containing hydrocarbon, which is a liquid at 25° C. when under normal atmospheric pressure. The volatile, completely halogenated hydrocarbon which we use preferably contains a minimum of one fluorine atom per carbon atom, and boils within the range of about 40° C. to about 100° C. under normal atmospheric pressure. Suitable volatile fluorine-containing completely halogenated hydrocarbons for this purpose are, for example, 1,2,2 trifluoro-1,1,2-trichloroethane and dichlorohexafluorocyclobutane. This coating composition will, in addition, preferably include a plasticizer for the ethyl hydroxyethyl cellulose.

Ethyl hydroxyethyl cellulose is soluble in ethanol and ethanol would appear to be a satisfactory solvent, when used alone, for this composition from the standpoint of its pleasant odor and lack of toxicity. However, it gives an unpleasant stinging and smarting sensation when applied to the lips. This stinging and smarting sensation continues until the ethanol has evaporated from the composition. The research which has resulted in this invention has demonstrated that the addition of hydrocarbon solvents which are more volatile than ethanol, such as hexane or octane, to the composition, increases the stinging and smarting sensation given by ethanol alone. On the other hand, the addition of less volatile aliphatic hydrocarbon solvents, such as, deodorized kerosene to the composition, causes the resultant film to be weak and tenuous. Other volatile solvents commonly used as coating compositions, such as the ketones, aromatic hydrocarbons, chlorinated solvents, and the higher boiling solvents, are objectionable because of odor, toxicity, or both.

Our research has demonstrated the surprising fact that the fluorine-containing, completely halogenated hydrocarbon solvents, when admixed with ethanol, materially reduced the tendency of the ethanol to cause a stinging and smarting sensation when applied to the lips, and the solutions of ethyl hydroxyethyl cellulose do not become tackly upon drying, and produce a strong, cohesive film. The fluorine-containing, completely halogenated hydrocarbon solvents are well known to be relatively non-toxic and to be unobjectionable in odor. They are entirely suitable, in admixture with ethanol, for application to the human lips.

The relative proportions of ethanol and of the volatile, fluorine-containing hydrocarbon solvents, which are used as a solvent mixture for the ethyl hydroxyethyl celluolse in the coating composition in accordance with this invention, can be varied over wide limits. The volatile, fluorine-containing hydrocarbon solvents are relatively expensive and for this reason, it is preferable to use a minor proportion of this solvent and a major proportion of the cheaper ethanol. Thus, for example, the solvent mixture used in this coating composition, may contain an amount of the fluorine-containing hydrocarbon solvent within the range of about 15%, by weight, to about 50%, by weight, and an amount of ethanol within the range of about 85%, by weight, to about 50%, by weight.

An amount of ethyl hydroxyethyl cellulose within the range of about 1%, by weight, to about 10%, by weight, is used in the composition. When using a high viscosity type of ethyl hydroxyethyl cellulose, we prefer to use an amount within the range of about 2%, by weight, to about 4%, by weight. We prefer to use an amount of a low viscosity type of ethyl hydroxyethyl cellulose within the range of about 4%, by weight, to about 8%, by weight.

The ethyl hydroxyethyl cellulose used in this composition is preferably of the high viscosity type. A high viscosity grade of ethyl hydroxyethyl cellulose which has a viscosity of, for example, 125 to 250 centipoises when measured at 25° C. using a 5% solution, by weight, of the ethyl hydroxyethyl cellulose in a mixed solvent consisting of 80 parts of toluene and 20 parts of ethanol, is entirely suitable for this purpose.

It is desirable to include a plasticizer in the composition. Suitable plasticizers are, for example, the methyl ester of hydrogenated rosin, hydroabietyl alcohol, dioctyl phthalate, methylphthalylethyl glycolate, castor oil and acetyl tributyl citrate. It is preferable to use an amount of the plasticizer within the range of about 10%, to about 100%, of the weight of the ethyl hydroxyethyl cellulose included in the composition.

The coating composition in accordance with this invention, is specifically illustrated by the following Examples 1–6, inclusive, which embody the advantageous features of the invention.

*Example 1*

| | Pts. by wt. |
|---|---|
| Ethyl hydroxyethyl cellulose (high viscosity type) | 3.0 |
| Acetyl tributyl citrate | 1.0 |
| Perfume and flavor | 0.5 |

Mixture of 80 parts by volume of ethanol and 20 parts by volume of 1,2,2-trifluoro-1,1,2-trichloroethane in amount to bring total volume of composition to 100 parts.

*Example 2*

| | Pts. by wt. |
|---|---|
| Ethyl hydroxyethyl cellulose (high viscosity type) | 3.0 |
| Acetyl tributyl citrate | 1.0 |
| 1,2,2-trifluoro-1,1,2-trichloroethane | 31.0 |
| Ethanol | 62.0 |
| Perfume and flavor | 0.5 |

*Example 3*

| | Pts. by wt. |
|---|---|
| Ethyl hydroxyethyl cellulose (high viscosity type) | 4.0 |
| Methyl phthalyl ethyl glycolate | 2.0 |
| 1,2,2-trifluoro-1,1,2-trichloroethane | 25.0 |
| Ethanol | 70.0 |
| Perfume and flavor | 0.5 |

*Example 4*

| | Pts. by wt. |
|---|---|
| Ethyl hydroxyethyl cellulose (high viscosity type) | 2.5 |
| Castor oil | 0.5 |
| Dichlorohexafluorocyclobutane | 20.0 |
| Ethanol | 80.0 |
| Perfume and flavor | 0.5 |

*Example 5*

| | Pts. by wt. |
|---|---|
| Ethyl hydroxyethyl cellulose (low viscosity type) | 6.0 |
| Dioctyl phthalate | 2.0 |
| 1,2,2-trifluoro-1,1,2-trichloroethane | 25.0 |
| Ethanol | 80.0 |
| Perfume and flavor | 0.5 |

*Example 6*

| | Pts. by wt. |
|---|---|
| Ethyl hydroxyethyl cellulose (low viscosity type) | 8.0 |
| Acetyl tributyl citrate | 2.5 |
| Dichlorohexafluorocyclobutane | 25.0 |
| Ethanol | 75.0 |
| Perfume and flavor | 0.5 |

The exact composition of the wax surface to which the composition in accordance with this invention is applied will depend upon the purpose of the composition. Thus, the composition of a lipstick is somewhat different from that of a wax crayon, while a wax shoe polish has still a somewhat different composition. However, all three types of compositions are alike in that they include both a wax and a pigment and are adapted to be spread as a film on a flexible surface.

The wax surface to which the coating composition in accordance with this invention is applied will be specifically illustrated by the following Examples 7-10, inclusive, of smearable lipstick compositions of the type now widely used. These compositions have been found highly satisfactory, except for their objectionable smearability.

Example 7

| | Pts. by wt. |
|---|---|
| Bees wax | 10 |
| Candelilla wax | 2.5-5 |
| Castor oil | 40 |
| Pigment | 15 |
| Dye | 1-2 |

Example 8

| | Pts. by wt. |
|---|---|
| Lanolin | 10 |
| Carnauba wax | 2.5 |
| Microcrystalline wax | 5-10 |
| Castor oil | 35 |
| Pigment | 12.5 |
| Dye | 2.5 |

Example 9

| | Pts. by wt. |
|---|---|
| Microcrystalline wax | 10-15 |
| Isopropyl myristate | 10-15 |
| Bees wax | 10 |
| Mineral oil (bland) | 20 |
| Propylene glycol | 5 |
| Pigment | 20 |
| Dye | 1.5 |

Example 10

| | Pts. by wt. |
|---|---|
| Lanolin | 7.5 |
| Paraffin | 10-15 |
| Ozocerite wax | 10-15 |
| Mineral oil | 15 |
| Castor oil | 15 |
| Vaseline | 5 |
| Pigment | 12 |
| Dye | 10 |

While by the foregoing Examples 7-10, we have specifically illustrated compositions of lipstick surfaces to which the coating composition in accordance with this invention may be applied, it will be fully understood that it is suitable for application to any wax surface. The surface may be composed essentially of any of the waxes listed in the foregoing Examples 7-10, and mixtures thereof, or of other waxes, such as, for example, cellulose stearate, cellulose palmitate, sorbitol stearate, sorbitol palmitate, mannitol stearate, mannitol palmitate, erythritol stearate, erythritol palmitate, ducitol stearate, ducitol palmitate, or mixtures thereof.

The coating film over the wax surface which is deposited from the coating composition in accordance with this invention comprised essentially of ethyl hydroxyethyl cellulose and preferably contains a plasticizer and consists of all ingredients of the coating composition, except the volatile solvents therein, i.e. the ethanol and the completely halogenated hydrocarbon.

In the foregoing, many specific details as to the coating composition and the combination of a wax surface and the coating of film in accordance with this invention have been given for the purpose of fully explaining the invention. However, it will be understood that many changes can be made in these details without departing from the spirit of the invention or the scope of the following claims.

We claim:

1. A coating composition adapted for the over-coating of a wax surface, which consists essentially of a liquid solution of about 1%, by weight, to about 10%, by weight, of an ethanol-soluble type of ethyl hydroxyethyl cellulose in an organic solvent mixture of ethanol and a volatile, completely halogenated fluoro-chloro hydrocarbon, which is a liquid at 25° C. when under atmospheric pressure.

2. A coating composition adapted for the over-coating of a wax surface which consists essentially of a solution of about 1%, by weight, to about 10%, by weight of ethanol-soluble ethyl hydroxyethyl cellulose in a solvent mixture of an amount of ethanol within the range of about 50%, by weight, to about 85%, by weight, and of an amount of a completely halogenated fluoro-chloro hydrocarbon solvent, which is a liquid at about 25° C. when under atmospheric pressure, within the range of about 50%, by weight, to about 15%, by weight.

3. A coating composition adapted for the over-coating of a wax surface which consists essentially of a solution of about 1%, by weight, to about 10%, by weight, of an ethanol-soluble type of ethyl hydroxyethyl cellulose in a solvent mixture consisting of about 50 to about 85 parts, by weight, of ethanol and about 50%, by weight, to about 15 parts, by weight, of a fluoro-chloro hydrocarbon which is completely halogenated and which has a boiling point within the range of about 40° C. to about 100° C. at atmospheric pressure.

4. A coating composition adapted for the over-coating of a wax surface which consists essentially of a solution of about 2%, by weight, to about 4%, by weight, of an ethanol-soluble type of ethyl hydroxyethyl cellulose of a high viscosity type in an organic solvent mixture of ethanol and a volatile completely halogenated fluoro-chloro hydrocarbon, which is a liquid at 25° C. when under atmospheric pressure.

5. A coating composition adapted for the over-coating of a wax surface which consists essentially of a solution of about 1%, by weight, to about 10%, by weight of an ethanol-soluble type of ethyl hydroxyethyl cellulose, and a plasticizer which is compatable with the ethyl hydroxyethyl cellulose in an organic solvent mixture of ethanol and a volatile completely halogenated fluoro-chloro hydrocarbon which is a liquid at 25° C. when under atmospheric pressure.

6. A coating composition adapted for the over-coating of a wax surface which consists essentially of a solution of about 1%, by weight, to about 10%, by weight, of an ethanol-soluble type of ethyl hydroxyethyl cellulose and a plasticizer which is compatable with the ethyl hydroxyethyl cellulose in amount within the range of about 10%, by weight, to about 100%, by weight, of the ethyl hydroxyethyl cellulose present, in an organic solvent mixture of ethanol and a volatile completely halogenated fluoro-chloro hydrocarbon which is completely halogenated and has a boiling point within the range of about 40° C. to about 100° C. at atmospheric pressure.

7. A coating composition adapted for the over-coating of a wax surface which consists essentially of a solution of about 1%, by weight, to about 10%, by weight of an ethanol-soluble type of ethyl hydroxyethyl cellulose in an organic solvent mixture of ethanol and 1,2,2-trifluoro-1,1,2-trichloroethane.

8. A coating composition adapted for the over-coating of a wax surface which consists essentially of a solution of about 1%, by weight, to about 10%, by weight of an ethanol-soluble type of ethyl hydroxyethyl cellulose in an organic solvent mixture of ethanol and dichlorohexafluorocyclobutane.

9. A coating composition adapted for the over-coating of a film of lipstick on the human lips which consists of a solution of about 1%, by weight, to about 10%, by weight, of an ethanol-soluble type of ethyl hydroxyethyl cellulose, a plasticizer for the ethyl hydroxyethyl cellulose in amount within the range of about 10%, by weight, to about 100%, by weight, of the ethyl hydroxyethyl cellulose and a minor amount of a perfume and flavor material, in an organic solvent mixture of about 50%, by weight, to about 85%, by weight, of ethanol and about 50%, by weight, to about 15%, by weight, of a volatile completeley halogenated fluoro-chloro hydrocarbon which is completely halogenated and has a boiling point within the range of about 40° C. to about 100° C. at atmospheric pressure.

References Cited in the file of this patent

UNITED STATES PATENTS 2,108,805    Finzel et al. _____ Feb. 22, 1938

OTHER REFERENCES

Ott et al.: "High Polymers," second edition (1954), vol. V, part II, pages 929–930.